(12) United States Patent
Locke et al.

(10) Patent No.: US 12,073,382 B2
(45) Date of Patent: *Aug. 27, 2024

(54) SECURE COUNTLESS PAYMENT METHOD AND DEVICE WITH MOVEMENT-ACTIVATED ELECTRONIC CIRCUITRY

(71) Applicant: Capital One Services, LLC, McLean, VA (US)

(72) Inventors: Tyler Locke, Jersey City, NJ (US); Adam R. Koeppel, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/457,094

(22) Filed: Aug. 28, 2023

(65) Prior Publication Data

US 2023/0401562 A1    Dec. 14, 2023

Related U.S. Application Data

(63) Continuation of application No. 17/528,148, filed on Nov. 16, 2021, now Pat. No. 11,741,457, which is a (Continued)

(51) Int. Cl.
*G06Q 20/34* (2012.01)
*G06F 3/01* (2006.01)
(Continued)

(52) U.S. Cl.
CPC ............ *G06Q 20/341* (2013.01); *G06F 3/01* (2013.01); *G06K 19/067* (2013.01);
(Continued)

(58) Field of Classification Search
CPC ............ G06Q 20/3278; G06Q 20/341; G06Q 20/352; G06Q 2220/00; G06F 3/01;
(Continued)

(56) References Cited

U.S. PATENT DOCUMENTS

| | | | |
|---|---|---|---|
| 6,594,760 B1 * | 7/2003 | Ryan, Jr. ................. | G06F 21/81 380/1 |
| 2004/0124248 A1 * | 7/2004 | Selker .............. | G06K 19/07749 235/492 |

(Continued)

FOREIGN PATENT DOCUMENTS

CN    105894268 B  *  2/2020 ............. G06F 3/041

OTHER PUBLICATIONS

STMicroelectronics, SRIX4K 1 13.56 MHz short-range contactless memory chip with 4096-bit EEPROM, anti-collision and anti-clone functions, 2008 (Year: 2008).*

*Primary Examiner* — Mohammad A. Nilforoush
*Assistant Examiner* — Wodajo Getachew
(74) *Attorney, Agent, or Firm* — Foley & Lardner LLP

(57) ABSTRACT

A contactless payment device including a wireless communication device; a power source; a processor coupled to the power source; an accelerometer communicatively coupled to the processor and the power source; and an actuator communicatively coupled to the wireless communication device and the processor. The actuator is configured to activate the wireless communication device when the actuator is set in a closed state, and deactivate the wireless communication device when the actuator is set in an open stat. The processor is configured to receive an incoming signal from the accelerometer; determine whether the incoming signal corresponds to a pre-programmed signal corresponding to an enabling gesture; and set the actuator in (Continued)

the closed state for a time interval, when the incoming signal corresponds to the enabling gesture.

20 Claims, 9 Drawing Sheets

Related U.S. Application Data continuation of application No. 15/992,873, filed on May 30, 2018, now abandoned, which is a continuation of application No. 15/969,556, filed on May 2, 2018, now Pat. No. 10,417,626.

(51) Int. Cl.
*G06K 19/067* (2006.01)
*G06K 19/07* (2006.01)
*G06K 19/077* (2006.01)
*G06Q 20/32* (2012.01)
*H04W 52/02* (2009.01)
*H04L 9/00* (2022.01)

(52) U.S. Cl.
CPC ... *G06K 19/0723* (2013.01); *G06K 19/07773* (2013.01); *G06Q 20/3278* (2013.01); *G06Q 20/352* (2013.01); *H04W 52/02* (2013.01); *G06K 19/07709* (2013.01); *G06Q 2220/00* (2013.01); *H04L 9/50* (2022.05); *Y02D 30/70* (2020.08)

(58) Field of Classification Search
CPC ............. G06K 19/067; G06K 19/0723; G06K 19/07773; G06K 19/07709; H04W 52/02
USPC .......................................................... 705/65
See application file for complete search history.

(56) References Cited

U.S. PATENT DOCUMENTS

| | | | | |
|---|---|---|---|---|
| 2006/0097991 | A1* | 5/2006 | Hotelling | G06F 3/04164 345/173 |
| 2010/0181845 | A1* | 7/2010 | Fiorello | H03H 7/40 307/104 |
| 2012/0309388 | A1* | 12/2012 | Moosavi | H04W 52/0254 455/426.1 |
| 2013/0339166 | A1* | 12/2013 | Baer | G06Q 20/405 705/16 |
| 2014/0138447 | A1* | 5/2014 | Goldman | G06K 19/06206 235/492 |
| 2015/0006378 | A1* | 1/2015 | Blythe | G06Q 20/354 705/41 |

* cited by examiner

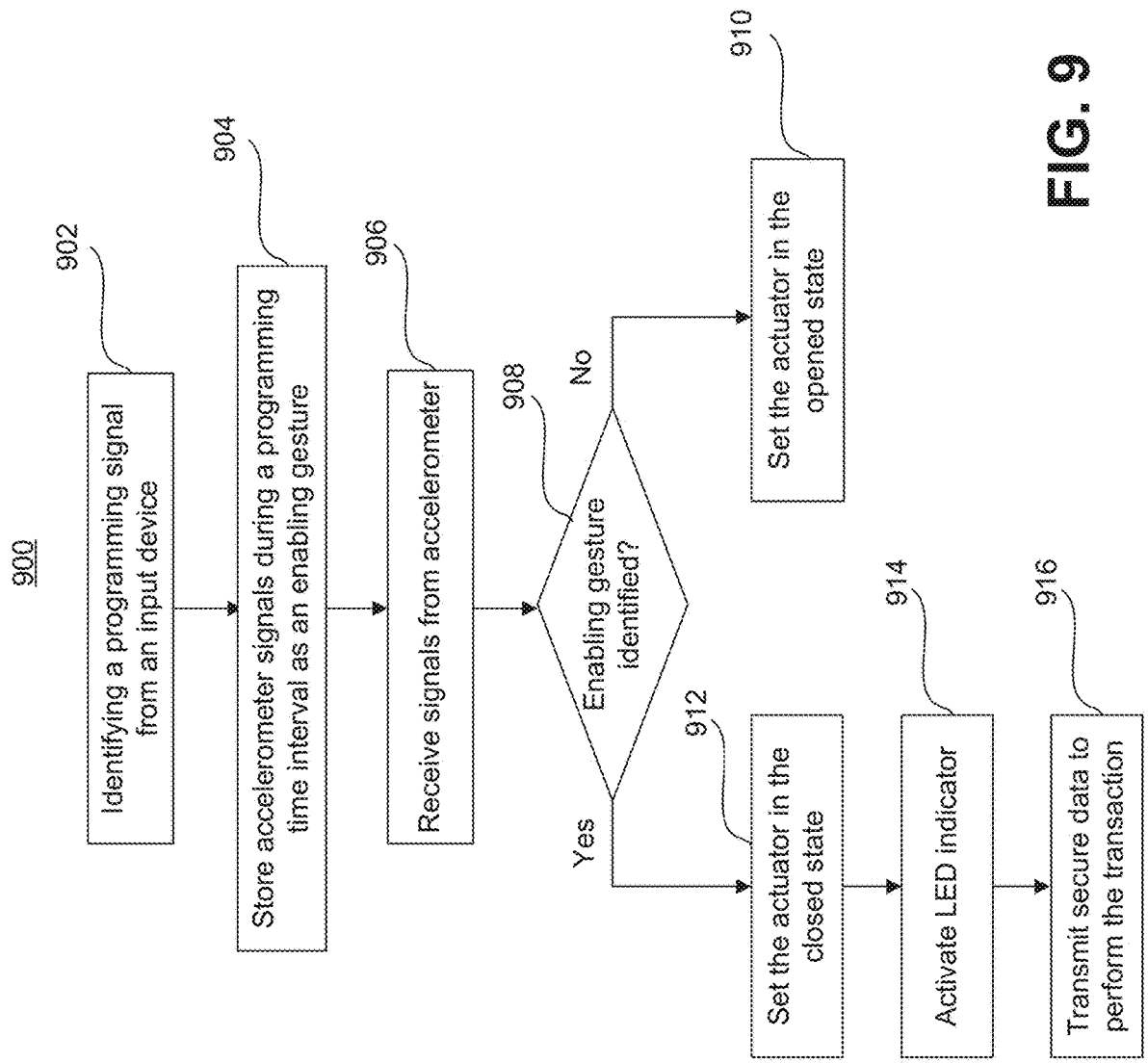

SECURE COUNTLESS PAYMENT METHOD AND DEVICE WITH MOVEMENT-ACTIVATED ELECTRONIC CIRCUITRY

CROSS-REFERENCE TO RELATED APPLICATIONS

This application is a continuation of U.S. patent application Ser. No. 17/528,148, filed Nov. 16, 2021, which is a continuation of U.S. patent application Ser. No. 15/992,873, filed May 30, 2018, which is a continuation of U.S. patent application Ser. No. 15/969,556, filed May 2, 2018. The content of the foregoing applications is incorporated herein in its entirety by reference.

TECHNICAL FIELD

The present disclosure relates generally to contactless payment methods and devices, and more particularly to contactless payment methods and devices configured to enable and disable wireless communication circuitry or systems based on user input.

BACKGROUND

Contactless payment methods employ devices such as credit cards and debit cards, key fobs, smart cards, smartphones, and similar devices that use wireless communication, such as radio-frequency identification (RFID) or near field communication (NFC), for making secure payments. Contactless payment devices include an embedded chip including an antenna that enable users to wave their card, fob, or handheld device in the vicinity of, but not touching, a reader at a point of sale terminal, such as terminal compatible with ISO 14443. Contactless payments devices generally require close physical proximity with the sale terminal.

Contactless payment devices have advantages over traditional payment devices that require inserting or swiping. For example, while traditional payment devices require a user to remove the device from the user's purse or wallet, contactless payment devices allow users to quickly perform transactions without such removal. In addition, contactless payment devices are less prone to physical degradation after prolonged use. For example, with regular credit cards a magnetic stripe may be damaged due to friction after prolonged use, requiring periodic replacement of the card. With contactless payment devices, however, there is no such degradation because there is no need to insert and remove the devices from a reader. These advantages of contactless payment devices have resulted in wide adoption of contactless payment methods to complete transactions.

However, contactless devices may be more vulnerable than traditional payment devices to wireless attacks that attempt to capture user or account information. Contactless payment devices normally rely on passive electronic circuitry to interact with payment terminals. Such device circuitry is powered and activated by the wireless circuitry within the payment terminal. After the passive electronic circuit is activated, it interacts with the payment terminal to exchange information and conduct the transaction. Using passive electronic circuitry in contactless payment devices is convenient because it avoids the requirement of embedded power sources.

However, such passive circuitry may create security challenges. The passive circuitry may be activated by an attacker mimicking a payment terminal, enabling the attacker to capture the confidential user information. In current contactless payment devices, the passive electronic circuitry does not have any method to authenticate activation signals and, therefore, the contactless payment device could be exposed to "spoofing" signals from an attacker.

Protocols such as NFC attempt to minimize risk of exposure by requiring close proximity between the contactless payment device and the payment terminal. However, an attack circuitry can modify payment terminal circuitry to expand the range of terminal range and attempt to broadcast signals to gather information. These attacks may be particularly effective in crowded areas such as trains, elevators, and large social events.

Special wallets, purses, and slip cases are now commercially available that block electromagnetic radiation and are designed to prevent these wireless attacks. Although such blocking devices are somewhat effective against the wireless attacks while the contactless payment device is stored, they are also inconvenient and undermine some of the key advantages of contactless payment methods. For instance, use of a blocking storage device requires a user to remove the contactless payment device from the storage device before engaging with the payment terminal. This added removal step undermines the functionality of a contactless payment device because a user is no longer able to quickly pay by merely approaching the payment terminal. Therefore, to improve security of the contactless payment methods while maintaining key advantages of these methods, it is necessary to create new security methods.

The disclosed systems and methods address one or more of these and other problems in the prior art.

SUMMARY

One aspect of the present disclosure is directed to a contactless payment device including a wireless communication device; a power source; a processor coupled to the power source; an accelerometer communicatively coupled to the processor and the power source; and an actuator communicatively coupled to the wireless communication device and the processor. The actuator may be configured to: activate the wireless communication device when the actuator is set in a closed state, and deactivate the wireless communication device when the actuator is set in an open state. The processor is configured to: receive an incoming signal from the accelerometer; determine whether the incoming signal corresponds to a pre-programmed signal corresponding to an enabling gesture; and set the actuator in the closed state for a time interval, when the incoming signal corresponds to the enabling gesture.

Another aspect of the present disclosure is directed to a system for performing a transaction with a contactless payment device. The system may include: a processor comprised in the contactless payment device; an accelerometer communicatively coupled to the processor; an actuator communicatively coupled to a wireless communication device comprised in the contactless payment device; and a storage medium storing instructions. When executed, the instructions may configured the processor to perform operations including: receiving an incoming signal from the accelerometer; determining whether the incoming signal corresponds to a pre-programmed signal corresponding to an enabling gesture; activating the wireless device of the contactless payment device by setting the actuator in a closed state when the incoming signal corresponds to the enabling gesture; transmitting secure data to perform a transaction via the wireless communication device; and deactivating the wireless device of the contactless payment device by setting the actuator in an open state when the secure data is transmitted.

Yet another aspect of the present disclosure is directed to a method for performing a transaction with a contactless payment device. The method may include receiving an incoming signal from an accelerometer comprised in a contactless payment device; determining whether the incoming signal corresponds to a pre-programmed signal corresponding to an enabling gesture; activating a wireless device of the contactless payment device by setting an actuator of a contactless payment device in a closed state when the gesture signal corresponds to the enabling gesture, the actuator being communicatively coupled with the wireless communication device of the contactless payment device; transmitting secure data to perform a transaction via the wireless communication device; and deactivating the wireless device of the contactless payment device by setting the actuator in an open state when the secure data is transmitted.

Another aspect of the present disclosure is directed to a contactless payment device including a wireless communication device comprising an antenna and a sensor communicatively coupled to the antenna. The antenna may be configured to resonate at a central frequency when a finger is pressed against the sensor, the central frequency allowing wireless communication with a payment terminal, and resonate at a detuned frequency when a finger is not pressed again the sensor, the detuned frequency preventing communication with the payment terminal.

Yet other aspect of the present disclosure is directed to a system for performing a transaction with a contactless payment device. The system may include a wireless communication device comprising an antenna; a sensor communicatively coupled to the antenna; and a cryptographic coprocessor. The antenna may be configured to resonate at a central frequency when a finger is pressed against the sensor, the central frequency allowing wireless communication with a payment terminal and resonate at a detuned frequency when a finger is not pressed again the sensor, the detuned frequency preventing communication with the payment terminal. The cryptographic coprocessor is configured to verify signals received from the antenna when the antenna resonates at the central frequency.

Yet another aspect of the present disclosure is directed to a method for performing a transaction with a contactless payment device. The method may include receiving a gesture signal from a sensor that a finger is being pressed against a sensor; configuring an antenna to resonate at a central frequency when the finger is being pressed against the sensor, the central frequency allowing wireless communication with a payment terminal; verifying, by a cryptographic coprocessor, signals received from the antenna when the antenna resonates at the central frequency; receiving a gesture signal from a sensor that a finger is not being pressed against a sensor; configuring an antenna to resonate at a detuned frequency when the finger is not being pressed against the sensor, the detuned frequency preventing communication with the payment terminal.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 9 is an exemplary flow chart illustrating a gesture programming and transaction process, consistent with disclosed embodiments.

DETAILED DESCRIPTION

The disclosure is generally directed to a contactless payment method and device that includes circuitry to prevent wireless attacks attempting to obtain account or customer information spoofing a card transaction. The device may include an actuator that activates or datives the wireless circuitry or systems based on user input. In some embodiments, the actuator may be controlled by active electronics that monitor user input to change the state of the actuator. In other embodiments, the contactless payment device may include electronic elements that react to a user interaction to modify a response, such as a resonant frequency, of the wireless circuits and enable their engagement with a payment terminal.

Such devices and methods may prevent wireless attacks by seamlessly activating or deactivating circuitry using typical user interaction with the device. For example, the circuitry in the device may recognize that a user has retrieved a wallet from a pocket, thereby activating the wireless circuitry and enabling interaction with a payment terminal. Alternatively, when the contactless payment device is stored in a wallet, circuitry of the contactless payment device may identify when a user has picked up or raised the wallet and enable the wireless circuitry. These features may address issues of contactless payment method security while sustaining the key advantages of contactless payment.

Reference will now be made in detail to the disclosed embodiments, examples of which are illustrated in the accompanying drawings.

Figure 1:
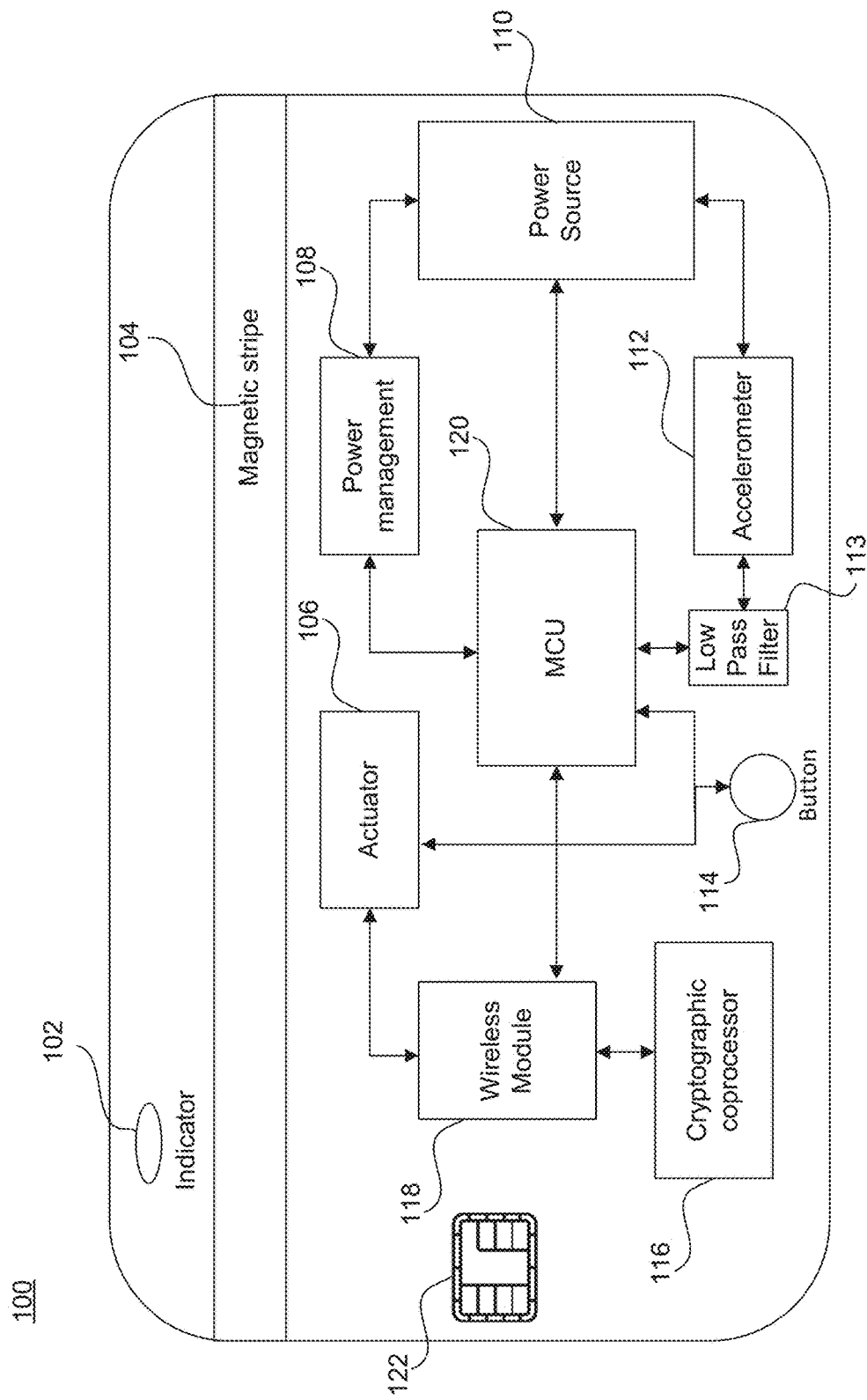
FIG. 1 is a block diagram of a first exemplary contactless payment device, consistent with disclosed embodiments.

FIG. 1 is a block diagram of a first exemplary contactless payment device. In some embodiments, device 100 may have the shape and form of a credit or debit card and include elements of a traditional credit or debit card such as a magnetic stripe 104 and/or a Europay, Mastercard and Visa (EMV) chip 122. Device 100 may additionally include wireless circuitry such a wireless module 118, a cryptographic coprocessor 116, and an actuator 106. Further, device 100 may include a power source 110 which may be coupled to a power management circuit 108, a microcontroller unit (MCU) 120, and an accelerometer 112. Moreover, device 100 may include a low-pass filter 113 and a control button 114. Elements in device 100 may be electrically coupled as it is indicated by arrows in FIG. 1. For example, accelerometer 112 may be connected to MCU 120 via a low-pass filter 113. However, connections other than those presented in FIG. 1 are possible. For example, instead of being connected directly to power source 110, MCU 120 may be connected to power source 110 only through power management circuit 108, or accelerometer 112 may be connected directly to MCU 120. Also, an indicator 102 is shown in FIG. 1 without a connection. However, in some embodiments indicator 102 may be connected to MCU 120 and/or power source 110.

In some embodiments, indicator 102 may be implemented as a single low-power light emitting diode (LED) connected to MCU 120. Alternatively, indicator 102 may be implemented as a multi-component indicator to display various patterns, based on instructions from MCU 120. For example, indicator 102 may be configured to be activated when actuator 106 is in a closed (i.e., connected) state to activate wireless module 118 circuitry.

Indicator 102 may also be configured to flash when a transaction is being taking place. In certain embodiments, indicator 102 may include a multiple-color LED displaying various colors, based on instructions from MCU 120. For example, indicator 102 may emit a green light when a transaction is successfully processed but emit a red color when a transaction is unsuccessful. Indicator 102 may also include devices other than LEDs. For example, indicator 102 may be implemented as other types of displays, such as liquid crystal displays (LCDs) or quad numeric display. Furthermore, indicator 102 may be implemented as non-light emitting devices, such as vibration indicators. Regardless of the type of indication, indicator 102 may be controlled by MCU 120 and be powered by power source 110 directly or via power management circuit 108.

Magnetic stripe 104 may store data encoded in iron-based magnetic particles on a band of magnetic material on device 100. Magnetic stripe 104, or magstripe, is read by swiping past a magnetic reading head.

Actuator 106 may be implemented as a switching device having an open (unconnected) or closed (connected) states. For example, actuator 106 may be implemented as a PMOS (or p-channel MOSFET) transistor. In some embodiments, the PMOS transistor may be normally biased in an open (or high-impedance) state and switch to a closed (saturation) state responsive to bias applied by MCU 120. Actuator 106 may also be implemented as other types of solid state switches, such as an NMOS transistor, a BJT transistor, or a controlled avalanche diode. In yet other embodiments, actuator 106 may be implemented as a non-solid state switch such as a magnetic switch or miniature vacuum tube.

In some embodiments, actuator 106 may include an actuator input that controls the status of actuator 106. For instance, instead of being connected to MCU 120, actuator 106 may have an independent input. In such embodiments, the actuator input may be directly coupled to power source 110 and may change the status of the actuator based on a charge level of power source 110, independent of the MCU 120 operation.

Power management circuit 108 may monitor and control power source 110. Power management circuit 108 may include one or more forms of electronic power conversion and/or relevant power control functions. In some embodiments, power management circuit 108 may be separated from power source 110. However, in other embodiments power management circuit 108 may be attached to or integrated with power source 110 to decrease the amount of space required. Power management circuit 108 may additionally include solid state devices that control the flow and direction of electrical power and supply multiple internal voltages (e.g., 5 V, 3.3 V, 1.8 V, etc.). Power management circuit 108 may incorporate multiple power conversion and control functions such as voltage supervision and undervoltage protection. By incorporating these functions into a single power management circuit 108, a number of improvements to the overall design can be made, such as better conversion efficiency, smaller solution size, and better heat dissipation.

In some embodiments, power management circuit 108 may include battery management, voltage regulation, and charging functions, and may include a DC-to-DC converter to provide dynamic voltage scaling. Moreover, power management circuit 108 may include dynamic frequency scaling in a combination known as DVFS (dynamic voltage and frequency scaling).

In some embodiments, power management circuit 108 may monitor the charge status of power source 110 and provide information to MCU 120, which may in turn send signals to indicator 102 to display the status of charging power source 110 or operate actuator 106.

In some embodiments, power management circuit 108 may include devices to charge power source 110. For instance, power management circuit 108 may include inductive charging elements, and use an electromagnetic field to transfer energy to power source 110 through electromagnetic induction. Thus, power management circuit 108 may be configured to identify and covert energy from a charging station, such as a charging station in a point-of-sale terminal. Power management circuit 108 may also include a first induction coil to create an alternating electromagnetic field from within a charging base. A second induction coil in the portable device then takes power from the electromagnetic field and converts it back into electric current to charge the battery. The two induction coils in proximity combine to form an electrical transformer. In some embodiments, power management circuit 108 may include silver-plated copper or aluminum to minimize weight and decrease resistance due to the skin effect. In other embodiments, power management circuit 108 may include devices and circuitry for wired charging. For example, power management circuit 108 may include USB ports to connect and charge power source 110.

Power source 110 may include primary cells (non-rechargeable batteries) and/or secondary cells (rechargeable batteries). For example, power source 110 may include solid-state batteries such as thin-film lithium-ion batteries or nickel oxyhydroxide battery. Power source 110 may alternatively include liquid or polymer electrolytes such as Lithium-ion or Lithium polymer batteries. In some embodiments, power source 110 may also include a nickel-cadmium battery.

In other embodiments, power source 110 may also include a supercapacitor. For instance, power source 110 may include electrostatic double-layer capacitors using carbon electrodes or derivatives, electrochemical pseudocapacitors using metal oxide or conducting polymer electrodes, and/or Hybrid capacitors, such as lithium-ion capacitors, using electrodes with differing characteristics: one exhibiting mostly electrostatic capacitance and the other mostly electrochemical capacitance.

Accelerometer 112 may include single- and/or multi-axis acceleration sensors that detect magnitude and direction of acceleration. In some embodiments, accelerometer 112 may sense orientation (because direction of weight changes), coordinate acceleration, vibration, shock, and falling in a resistive medium (a case where the proper acceleration changes, since it starts at zero, then increases). Accelerometer 112 may include microelectromechanical systems (MEMS) controlled by MCU 120.

Accelerometer 112 may include accelerometers working under principles of bulk micro-machined capacitance, bulk micro-machined piezoelectric resistivity, capacitive spring-mass system base, DC response, electromechanical servo (servo Force Balance), magnetic induction, tuned impact hammer, null-balance, pendulous integrating gyroscopic accelerometer (PIGA), piezoelectric accelerometer, strain gauge, surface acoustic wave (SAW), surface micro machined capacitive (MEMS), thermal (submicrometre CMOS process), triaxial, vacuum diode with flexible anode, and/or potentiometric type.

In other embodiments, accelerometer 112 may include alternative electronic devices to measure acceleration, velocity, or force. For example, accelerometer 112 may include a gyroscope, an inclinometer, an inertial measurement unit, a magnetometer, and/or a Vibration Calibrator. Sensors in device 100 may be subjected to electrical noise. For example, signals from accelerometer 112 may be subject to a plurality of noise sources. To facilitate data processing and improve detection of user gestures, signals from accelerometer 112 may be filtered with low-pass filter 113, which may include analog or digital circuitry to perform low-pass or band-pass filtering operations. For example, to remove noise from the wireless device circuitry, signals from accelerometer 112 may be filtered to eliminate high-frequency signals that are used in the wireless communication. In such embodiments, low-pass filter 113 may be a resistance-capacitance RC filter configured to have a low cutoff frequency determined by 1/RC.

Alternatively, low-pass filter 113 may include a resistance-inductance (RL) filter, a second-order filter, or a high-order filter with a combination of electronic components. However, in other embodiments, low-pass filter 113 may include a digital filter which first digitizes the signal from accelerometer 112 and then filters it using a data processing technique such a Fast Fourier Transform (FFT). For example, low-pass filter 113 may include an analog-to-digital converter coupled with at least one of Besselfilters, Butterworth filters, or Savitzky-Golay filters, among other configurable digital filters.

Button 114 may include a user input device connected to the MCU 120. For example, button 114 may include a pushbutton connected to MCU 120.

Cryptographic coprocessor 116 may include a secure cryptoprocessor chip or a microprocessor dedicated to carrying out cryptographic operations, embedded in a packaging with multiple physical security measures. Such measures may give cryptographic coprocessor 116 a degree of tamper resistance. In some embodiments, cryptographic coprocessor 116 may be configured to host contactless applets and output decrypted data onto a bus in a secure environment. Cryptographic coprocessor 116 may not output decrypted data or decrypted program instructions in an environment where security cannot always be maintained.

In some embodiments, cryptographic coprocessor 116 may be configured to perform operations comprising tamper-detecting and tamper-evident containment. In such embodiments cryptographic coprocessor 116 may include conductive shield layers in the chip that prevent reading of internal signals, controlled execution to prevent timing delays from revealing any secret information, and/or automatic zeroization of stored data in the event of tampering.

Moreover, cryptographic coprocessor 116 may be configured with chain-of-trust boot loader and/or a chain-of-trust operating system which authenticates an operating system before loading it. Cryptographic coprocessor 116 may also include hardware-based capability registers, implementing a one-way privilege separation model.

In other embodiments, cryptographic coprocessor 116 may be optimized for public key operations targeting network infrastructure across the enterprise and the data center. These operations may execute public key algorithms such as RSA, Diffie Hellman and Elliptic Curve Cryptography (ECC) forming the basis of digital signature and key exchange protocols to make secure transactions possible. By providing public key acceleration, the cryptographic coprocessor 116 may enable networks to efficiently handle SSL and IPsec traffic that requires public key. However, cryptographic coprocessor 116 may also accelerate bulk encryption.

Wireless module 118 may include a near-field communication (NFC) module to communicate with a payment terminal via NFC. For example, NFC may include a module that includes NFC tags containing data, which are typically read-only, but may be writeable. Wireless module 118 may be custom-encoded by the manufacturers or use NFC Forum specifications. The wireless module 118 may securely store personal data such as debit and credit card information, loyalty program data, PINs and networking contacts, among other information. Wireless module 118 may include between 96 and 4,096 bytes of memory, and may use induction between two loop antennas located within each other's near field, effectively forming an air-core transformer. In some embodiments, wireless module 118 may operate within the globally available and unlicensed radio frequency ISM band of 13.56 MHz.

Wireless module 118 may additionally include a loop antenna or NFC coil with an electronic switch (or capacitive sensor) in series, and may also include other types of wireless communication. For instance, wireless module 118 may include modules for other RFID standards specifying proprietary data formats in a closed-loop system. Also, using different frequencies can allow for longer ranges, as commonly used in shipping to track items in a warehouse. For example, wireless module 118 may include a module to perform RFID Radio frequency identification (RAIN). In yet other embodiments, wireless module 118 may include modules for BLE-13 Bluetooth Low-Energy, or Beacons. In such embodiments, wireless module 118 may use standard wireless protocols used in many portable devices to allow greater range than NFC. In yet other embodiments, wireless module 118 may include WiFi, ZigBee, Z-Wave and/or LiFi, Ultrasonic, or Chirpcast modules.

Figure 2:
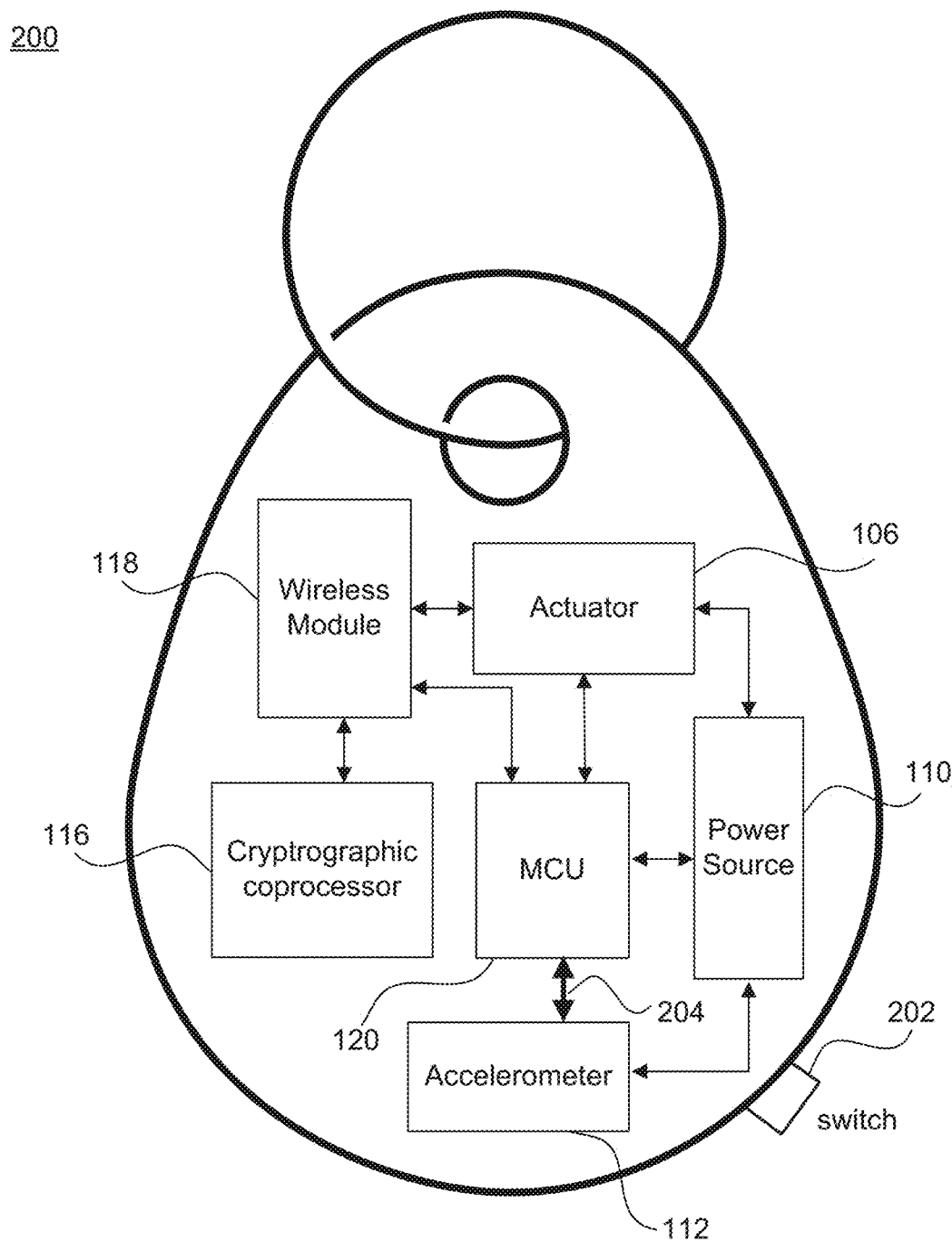
FIG. 2 is a block diagram of a second exemplary contactless payment device, consistent with disclosed embodiments.

FIG. 2 is a block diagram of a second exemplary contactless payment device 200. Device 200 may have the form of a key fob instead of a card, and may include components similar to contactless payment device 100 described in connection to FIG. 1. For example, as shown in FIG. 2, device 200 may also include power source 110, actuator 106, accelerometer 112, MCU 120, cryptographic coprocessor 116, and/or wireless module 118. Other elements not shown in FIG. 2 may also be part of device 200. For instance, device 200 may additionally include an indicator and/or a power management circuit similar to indicator 102 and power management circuit 108 (FIG. 1).

Some elements of device 200 may be different from those of device 100. For example, instead of control button 114, device 200 may include a slide switch 202. Moreover, device 200 may include a noise-reducing wire 204 that serves similar functions to low-pass filter 113. For example, noise-reducing wire 204 may electrically couple accelerometer 112 with MCU 120 to prevent electrical noise from obscuring the signal from accelerometer 112.

When a user is performing a gesture with device 200, friction between plastic, the user, and electronic components may generate a static charge affecting the signal from accelerometer 112. This phenomenon is referred to as the "triboelectric effect," and may result in a very large static charge when cables are un-terminated, or terminated with a very high resistance. For example, when a charge mode of accelerometer 112 is employed, the accelerometer's impedance may be in the giga-ohm region. Moreover, amplifiers in MCU 120 may also have a high input impedance. Therefore, in some embodiments, noise-reducing wire 204 may include a center conductor, a triboelectric dispersion layer, and a braided shield to minimize noise. In other embodiments, noise-reducing wire 204 may be implemented as a coaxial cable used with single axis and triaxial charge mode sensors. In yet other embodiments, noise-reducing wire 204 may include SMA connectors, and may include a special conductive coating on Teflon insulation to reduce static electricity generated when the shield rubs on the center conductor. Even with the use of noise reducing wire 204 noise may not be completely eliminated. Therefore, the use of noise-reducing wire 204 may be coupled with a low-pass filter 113 to further remove noise from the signal produced by accelerometer 112.

Figure 3:
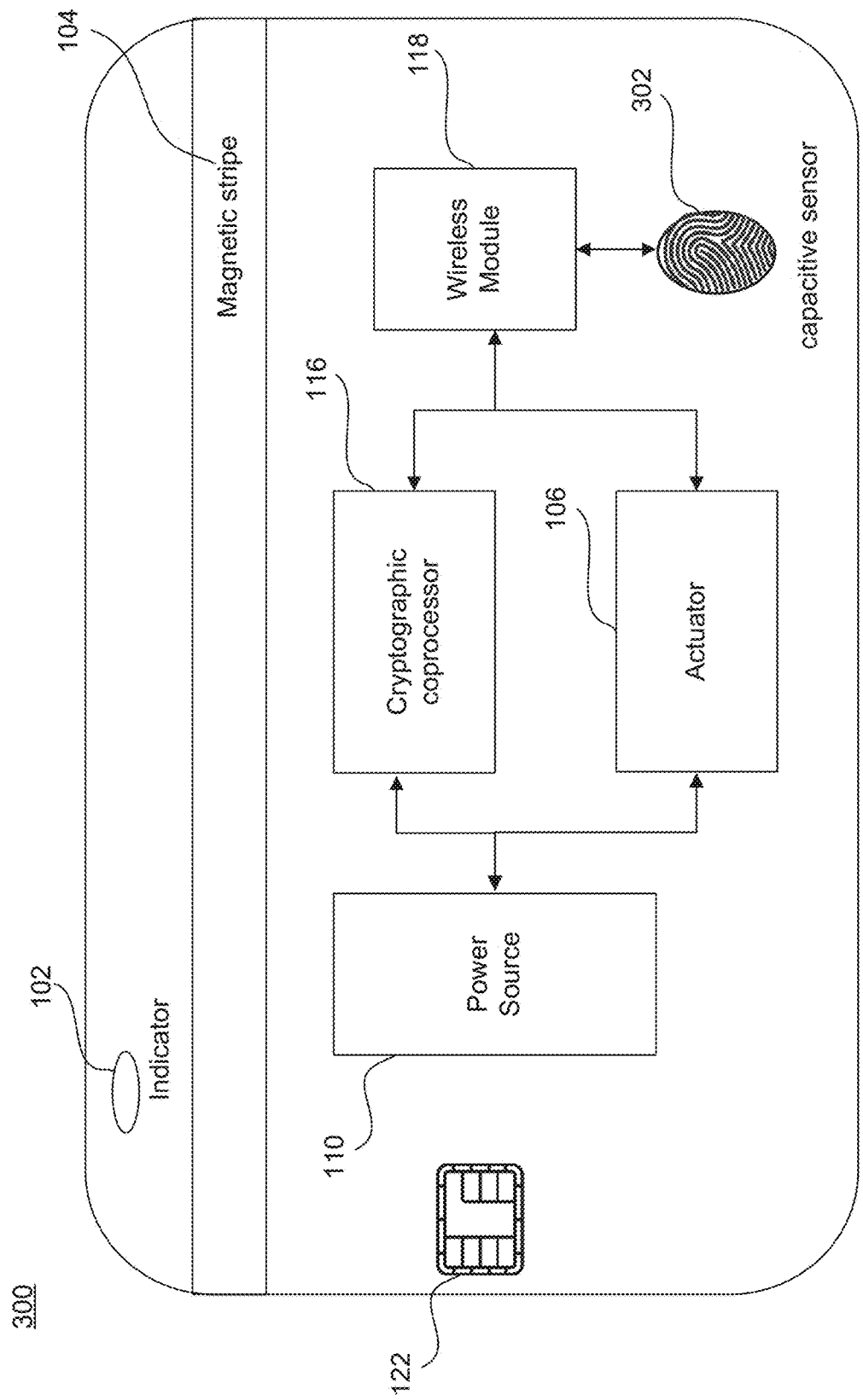
FIG. 3 is a block diagram of a third exemplary contactless payment device, consistent with disclosed embodiments.

FIG. 3 is a block diagram of a third exemplary contactless payment device, consistent with disclosed embodiments. Similar to device 100 described in connection to FIG. 1, device 300 may have the form factor of a credit or debit card, and may include standard credit card elements such as magnetic stripe 104 and EMV chip 122. Like devices 100 and 200, device 300 may include power source 110 connected to a cryptographic coprocessor 116, and an actuator 106. In addition, device 300 may also include wireless module 118. However, instead of using an MCU 120 to control actuator 106, device 300 may achieve the security features with a capacitive sensor 302 that may be used to modify a resonance frequency of antennas in wireless module 118. Because the human body has a natural capacitance (in the tens to low hundreds picofarad range), when a human finger is pressed against capacitive sensor 302, an impedance change is introduced into wireless module 118 in, for example, the antenna or NFC coil.

Capacitive sensor 302 may be constructed from copper, indium tin oxide (ITO), and/or printed ink. Capacitive sensor 302 may be connected to a ground plane to prevent the parasitic capacitance of the sensor that is related to the electric field (e-field) path to ground. For example, in the key fob shape of device 200, the capacitive sensor may be a touch sensor electrically coupled to a ring of the key fob that may act as a ground plane to limit the concentration of e-field lines.

Capacitive sensor 302 may include coupled row and column electrodes or may increase the parasitic capacitance to ground. In both cases, capacitive sensor 302 may generate a differential capacitive signal from the impression of a finger.

Capacitive sensor 302 may be used to implement proximity detection with a resonance-based approach to capacitive sensing. In other embodiments, a sensor sensitive to changes in inductance may be used to change the resonance frequency of antennas or other wireless components. For example, an LC resonator may be constructed with a fixed inductor. To measure an inductance variation, the LC resonator may use a variable capacitor. Then, a capacitive change caused by the presence of a finger on capacitive sensor 302 may be used to change the resonant response of antennas in wireless module 118. From this principle, it is possible to design antennas to have a resonant frequency that matches the frequency delivered by a point-of-sale terminal (i.e., an operational frequency) but have a different frequency when there is no interaction with capacitive sensor 302 (i.e., a detuned frequency). Accordingly, the wireless module 118 may only respond to an activation signal when there is a finger on the capacitive sensor 302. Otherwise, such as in an attack situation, the circuit frequency would not match the frequency delivered by a point-of-sale terminal and the wireless circuitry of the contactless payment device would not respond to the external activation.

In some embodiments, capacitive sensor 302 may include a temperature compensation that modifies the resonant frequency according to a given calibration. For example, capacitive sensor 302 may include thermal resistive sensors that modify resistivity based on temperature. In such scenarios, the frequency change induced by the capacitive sensor may be a function of temperature to always attempt to be in the range of 13.5 MHz, to be able to respond to a point-of-sale terminal activation signal.

In some embodiments, capacitive sensor may have a baseline tracking value that monitors the resonant frequency of the wireless module 118 elements. For example, capacitive sensor 302 may adapt changes in resonant frequency caused by a finger approximation based on an estimated resonance frequency of wireless module 118 elements.

Like device 100, device 300 may include cryptographic coprocessor 116. Cryptographic coprocessor 116 may include a secure cryptoprocessor chip or a microprocessor dedicated to carrying out cryptographic operations, embedded in a packaging with multiple physical security measures. Once the wireless circuitry is activated with capacitive sensor 302 and it receives an activation signal from a point-of-sale terminal, cryptographic coprocessor 116 may perform operations to encrypt and decrypt data. In some embodiments, these operations may be similar to the ones described above for device 100. For example, cryptographic coprocessor 116 may be configured to perform tamper-detecting and tamper-evident containment operations. Cryptographic coprocessor 116 may also include hardware-based capability registers, implementing a one-way privilege separation model. Alternatively or additionally, cryptographic coprocessor 116 may manage public key operations.

Figure 4:
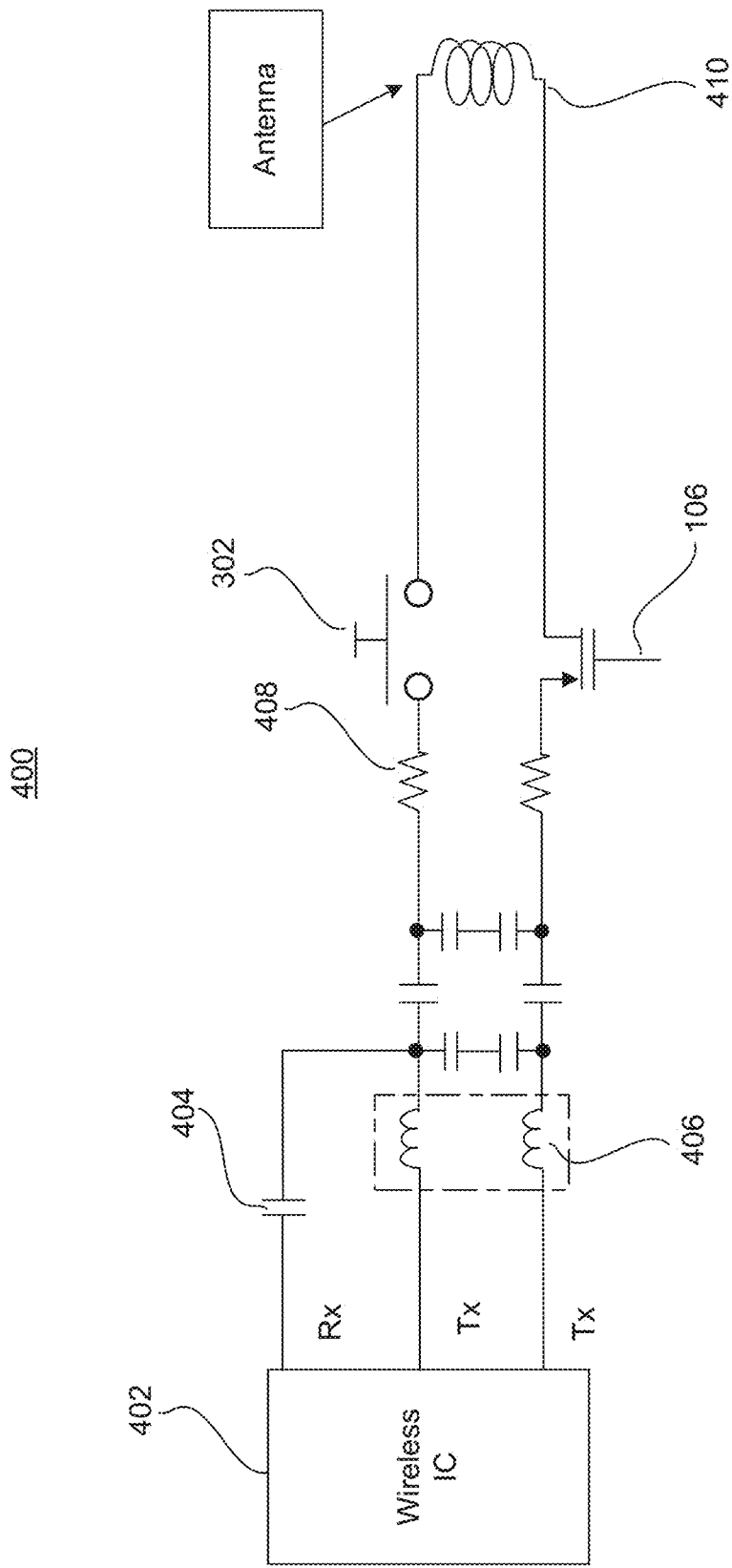
FIG. 4 is an exemplary circuit diagram, consistent with disclosed embodiments.

FIG. 4 is diagram of an exemplary circuit 400 for wireless module 118. Circuit 400 includes a wireless integrated circuit (wireless IC) 402, capacitors 404, inductors 406, resistors 408, and antenna 410. As described in FIG. 4, circuit 400 may include actuator 106. Circuit 400 may also include capacitive sensor 302.

Antenna 410 may be of various types. For example, antenna 410 may be a tag antenna, another type of microstrip antenna such as a patch antenna or a loop antenna, a planar inverted-F antenna (PIFA), or a folded inverted conformal antenna (FICA). In some embodiments, antenna 410 may be a combination of connected antennas calibrated for the changes in resonance frequencies disclosed in connection to FIG. 5.

In embodiments in which the actuator 106 is part of circuit 400, it may be connected in series with antenna 410. In those embodiments, when actuator 106 is in an open position (i.e., subthreshold if using a PMOS transistor), the antenna would be in an open circuit and therefore would not respond to external signals. That is, an actuator 106 connected in series with the antenna may prevent operation of circuit 400 and wireless module 118 by disconnecting components of circuit 400. Similarly, actuator 106 may disable circuit 400 and wireless module 118 by disconnecting one or more pins of wireless IC 402. For instance, actuator 106 may disconnect the receiver pin of wireless IC 402 to prevent interaction with any activation signal.

In some embodiments, wireless IC 402 may be an NFC IC, specifically configured for NFC communication.

In some embodiments, as described in FIG. 4, actuator 106 may be a PMOS transistor whose gate is controlled by MCU 120 (not shown in FIG. 4). In those embodiments, MCU 120 may control the biasing voltage of actuator 106 to bias actuator 106 into saturation or subthreshold, thereby enabling or disabling circuit 400 and wireless module 118. For example, when MCU 120 receives an activation signal from accelerometer 112, it may bias actuator 106 into saturation to connect antenna 410 with other components of circuit 400 by placing a floating, high, or low impedance on an input of actuator 106. However, other embodiments may use switching devices different from a PMOS device. For instance, alternative embodiments may user other solid state switching devices, like an NMOS transistor or a controllable diode. Alternatively, in other embodiments, actuator 106 may be a mechanical switch, like a push button, that establishes connection between elements of the circuit when the switch is operated. In those embodiments, actuator 106 may not be controlled by MCU 120.

Capacitive sensor 302 may be part of circuit 400, as shown in FIG. 4, connected in series with antenna 410. However, based on a desired change in resonant frequency, capacitive sensor 302 may alternatively be connected in parallel with antenna 410. In some embodiments, circuit 400 may have multiple capacitive sensors. For example, circuit 400 may include two capacitive sensors 302 so a user would need to properly place two fingers on device 300 to conduct a transaction.

In the different configurations of capacitive sensor 302 in circuit 400, the effective impedance of antenna 410 may be modified by interaction with capacitive sensor 302 or multiple sensors. For instance, when a user touches capacitive sensor 302 it may affect an impedance of series-connected antenna 410. The new impedance would change the resonance frequency of antenna 410 allowing the performance of wireless communications as described previously in connection to FIG. 3. Resistors 408, inductors 406, and capacitors 404, may be also connected in to antenna 410 and capacitive sensor 302 to manipulate the resonance frequency and calibrate it in a desired frequency.

Figure 5:
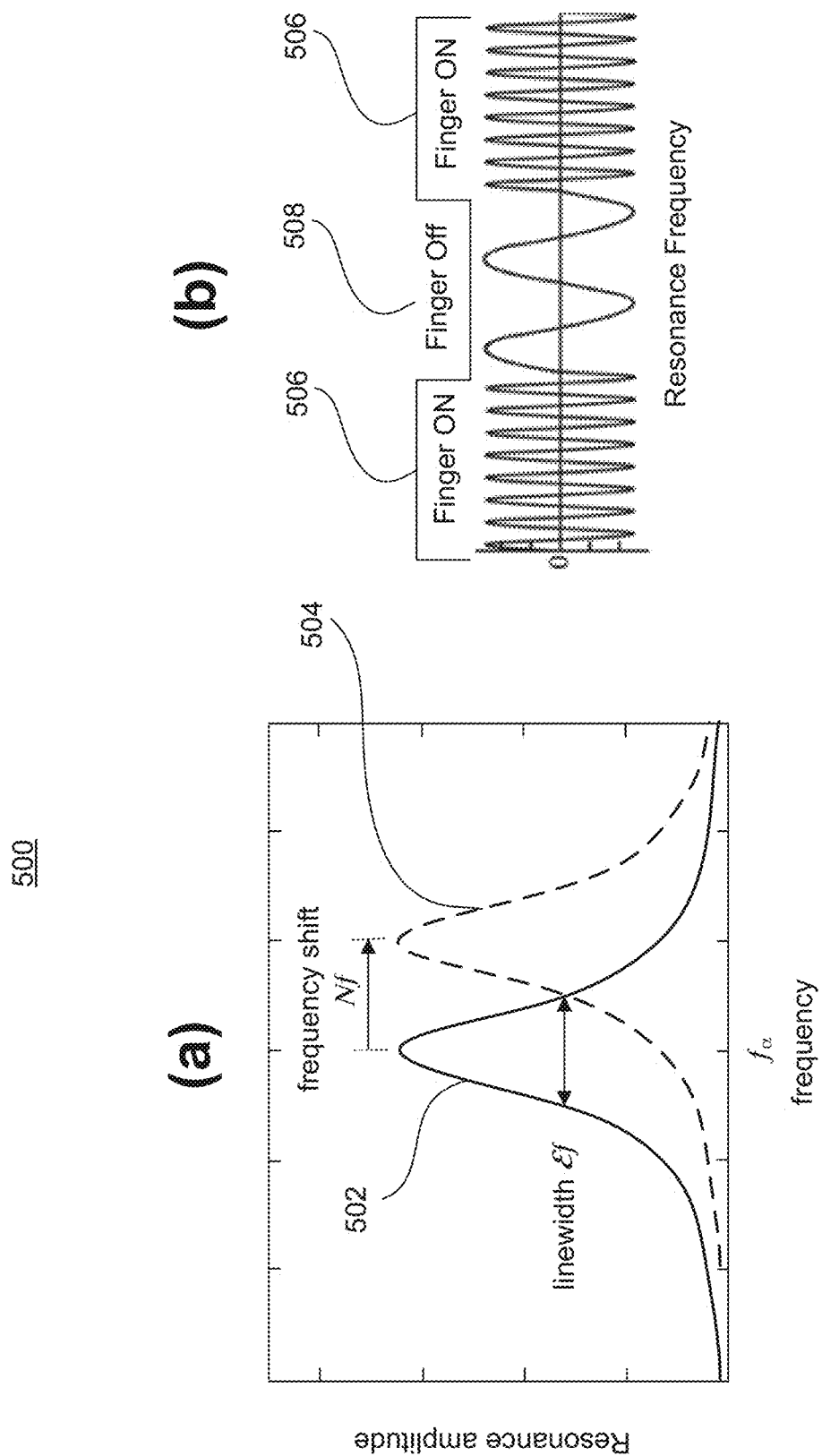
FIG. 5 shows exemplary resonant frequency shifts of a wireless module, displayed in frequency and time domains, consistent with disclosed embodiments.

FIG. 5 shows exemplary resonant frequency shifts, displayed in frequency and time domains.

FIG. 5 describes a shift in resonant amplitude between base frequency 502 and an operating frequency 504. For example, if there is no interaction with the capacitive sensor 302, then antenna 410 may resonate with the amplitude distribution of base frequency 502 which may correspond to a peak resonance at a detuned frequency. However, when there is interaction with capacitive sensor 302, the resonant distribution of antenna 410 or the overall wireless module 118 shifts Nf, to the operating amplitude which may correspond to an operation frequency.

FIG. 5 also shows a similar effect on resonance frequency when operating the capacitive sensor 302. The resonance frequency of wireless module 118, or a specific component, such as antenna 410, may be modulated by interacting with capacitive sensor 302. For instance, when a finger is on the capacitive sensor 302, the resonance frequency of the wireless module 118 may be higher than when the finger is off. The two resonance frequencies are represented in an operating frequency 506 and detuned frequency 508.

As shown in FIG. 5, interaction with a capacitive sensor 302 may increase the resonance frequency. However, in other embodiments, interaction with capacitive sensor 302 may decrease the resonance frequency. For example, operating frequency 504 may be approximately 13.56 MHz, while base frequency 502 may be a lower frequency of 13 MHz. However, the operating frequency 504 may be 13.56 but a detuned frequency may be 14 MHz. In other embodiments, the operating frequency 504 may be in Low Frequency (LF) 125-134 kHz or Ultra High Frequency (UHF) 856 MHz to 960 MHz. In those embodiments, antenna 410 may be designed to match operating frequency 504.

Figure 6:
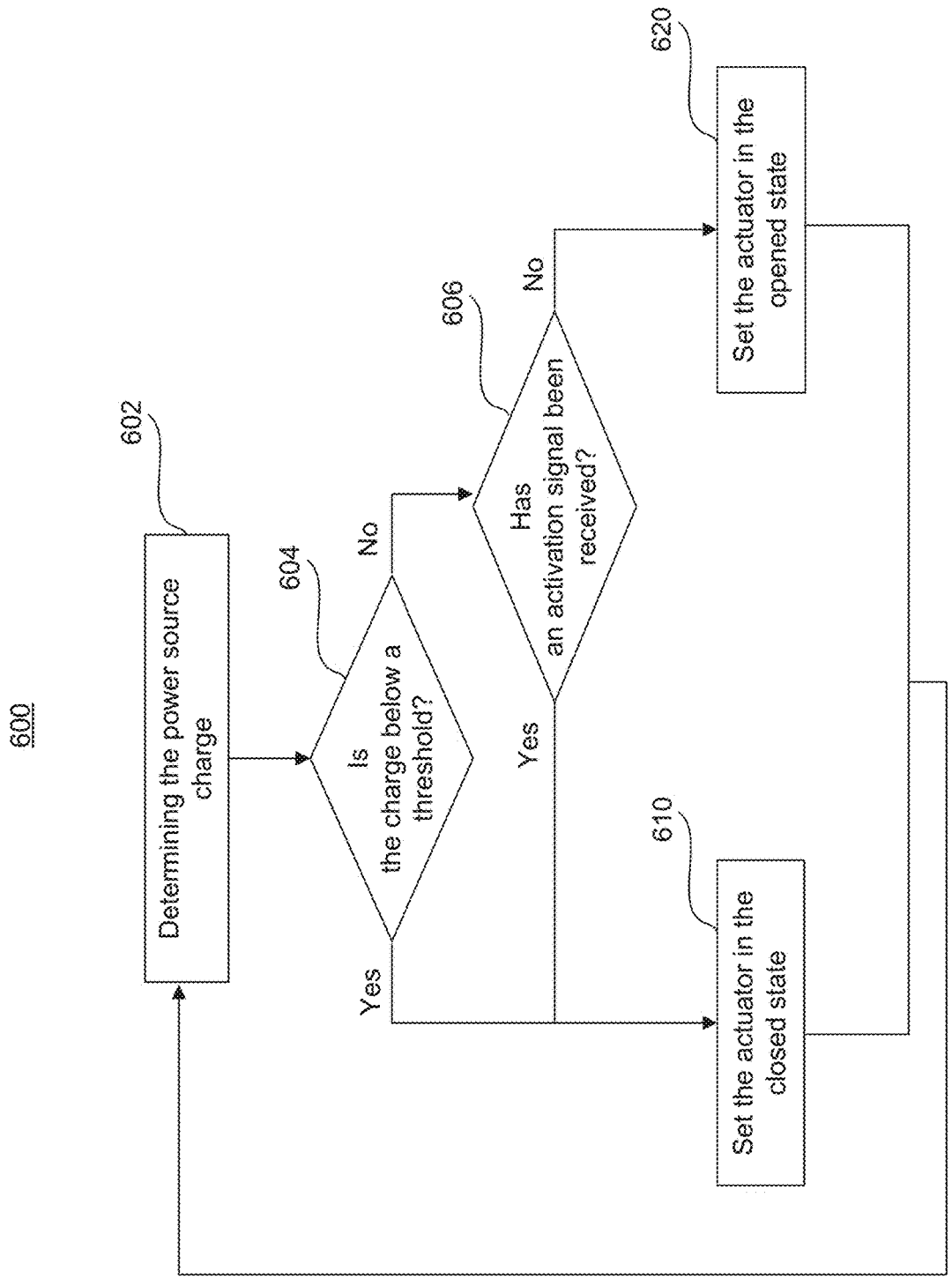
FIG. 6 is an exemplary flow chart illustrating an actuator operation based on power source charge, consistent with disclosed embodiments.

FIG. 6 is an exemplary flow chart illustrating an actuator state determination based on power source charge. A depleted power source 110 may prevent a user from utilizing a contactless payment device with the security features described in this disclosure. For example, if a contactless payment device is activated with an accelerometer gesture but the battery powering the accelerometer is depleted, then a user would not be able to use the device to complete the transaction. To avoid these issues, it may be possible to program a default activation when the battery is depleted following process 600. Process 600 may be performed by MCU 120. However, other elements within contactless payment method that may also monitor power source 110 and operate actuator 106 to perform process 600.

In step 602, MCU 120 may determine the charge remaining in power source 110. For example, MCU 120 may transmit instructions to power management circuit 108 to determine the charge level of power source 110.

In step 604, MCU 120 may determine if the charge level of power source 110 is below a threshold. For instance, MCU 120 may determine if the charge level is below a critical charge level for proper operation of accelerometer 112 operation. If MCU 120 determines the charge level is below a threshold (step 604: yes), then MCU 120 may continue to step 610 and set actuator 106 in the closed or connected state. In this way, the user may still use the contactless payment device wireless functions even though the battery charge is depleted and below the threshold value. In step 610, MCU 120 may additionally transmit a signal to indicator 102 to send a signal to the user that the power of power source 110 is depleted. However, if MCU 120 determines the charge is not below a threshold (step 610: no), MCU 120 may continue to step 606.

In step 606, MCU may determine if an activation signal has been received. For example, MCU 120 may determine if an accelerometer gesture has been received or if a capacitive sensor has been operated. When MCU 120 determines that the activation signal has been received, it may continue to step 610 and set the actuator in the closed state. However, if an activation signal has not been received (step 606: no), and because power source 110 charge is above the threshold, MCU 120 may set the actuator in an open state (disconnected) that prevents operation of the wireless circuitry in device 100.

Therefore, process 600 allows activating the wireless operations when there is not enough battery charge available to support the standard activation, but still requires user activation when there is enough charge to detect and respond to user interaction.

Figure 7:
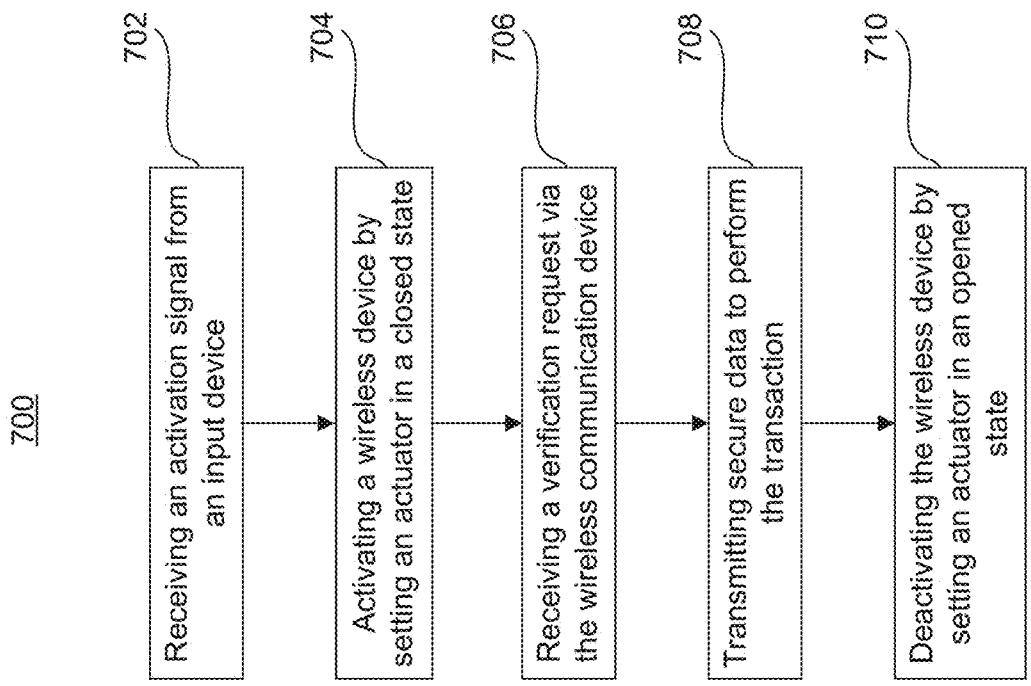
FIG. 7 is an exemplary flow chart illustrating a transaction using a contactless payment device, consistent with disclosed embodiments.

FIG. 7 is an exemplary flow chart illustrating a transaction with a contactless payment method. In some embodiments, process 700 may be conducted by MCU 120. However, in other embodiments, process 700 may be performed by other processing circuits in a contactless payment method.

In step 700, MCU 120 may receive an activation signal from an input device. For example, MCU 120 may receive an activation signal from button 114 or switch 202. Alternatively, MCU 120 may receive an activation signal from accelerometer 112 or a signal from capacitive sensor 302.

In step 704, MCU 120 may set actuator 106 to active wireless modules. For instance, upon receiving the activation signal in step 702, MCU 120 may set biasing conditions for actuator 106 so the actuator is in a closed state. In some embodiments, setting actuator 106 in a closed state may activate wireless devices like wireless module 118. For example, as described in FIG. 4, actuator 106 may be connected in series with wireless devices. Thus, setting actuator 106 in a closed state may complete and activate the wireless circuits. In some embodiments, merely activating wireless module 118 may allow a user to perform a wireless transaction because the wireless operation can be performed without further verification. However, as it will be described in steps 706-708 and in connection to FIG. 8, additional verification steps may be performed to secure the transaction with software routines.

In step 706, MCU 120 may receive a verification request via wireless communication devices. For example, once activated, wireless module 118 may receive signals from a payment terminal. MCU 120 may then receive a request from the payment terminal via the wireless module 118. MCU 120 may relay information to cryptographic coprocessor 116 and determine if the request may be verifiable.

In step 708, MCU 120 may transmit instructions to wireless devices to transmit information and perform the transaction. For example, if MCU 120 determines that the request is verified, then MCU 120 may request wireless module 118 to respond to a payment terminal request and send information to complete the transaction.

In step 710, MCU 120 may deactivate the wireless devices by setting actuator 106 in an open state to prevent further wireless interactions until there is a new activation signal form an input device. For instance, in step 710 MCU 120 may bias actuator 106 so it disconnects wireless module 118 from other circuits.

In some embodiments, MCU 120 may set the actuator in an open state even if there is no transaction at step 708. For example, MCU 120 may include a timer. The timer may start a count down in step 702. To prevent a constant activation of the wireless circuitry that exposes the contactless payment device to wireless attacks, regardless of whether a transaction has been performed, MCU 120 may continue to step 710 when the timer completes a count.

Figure 8:
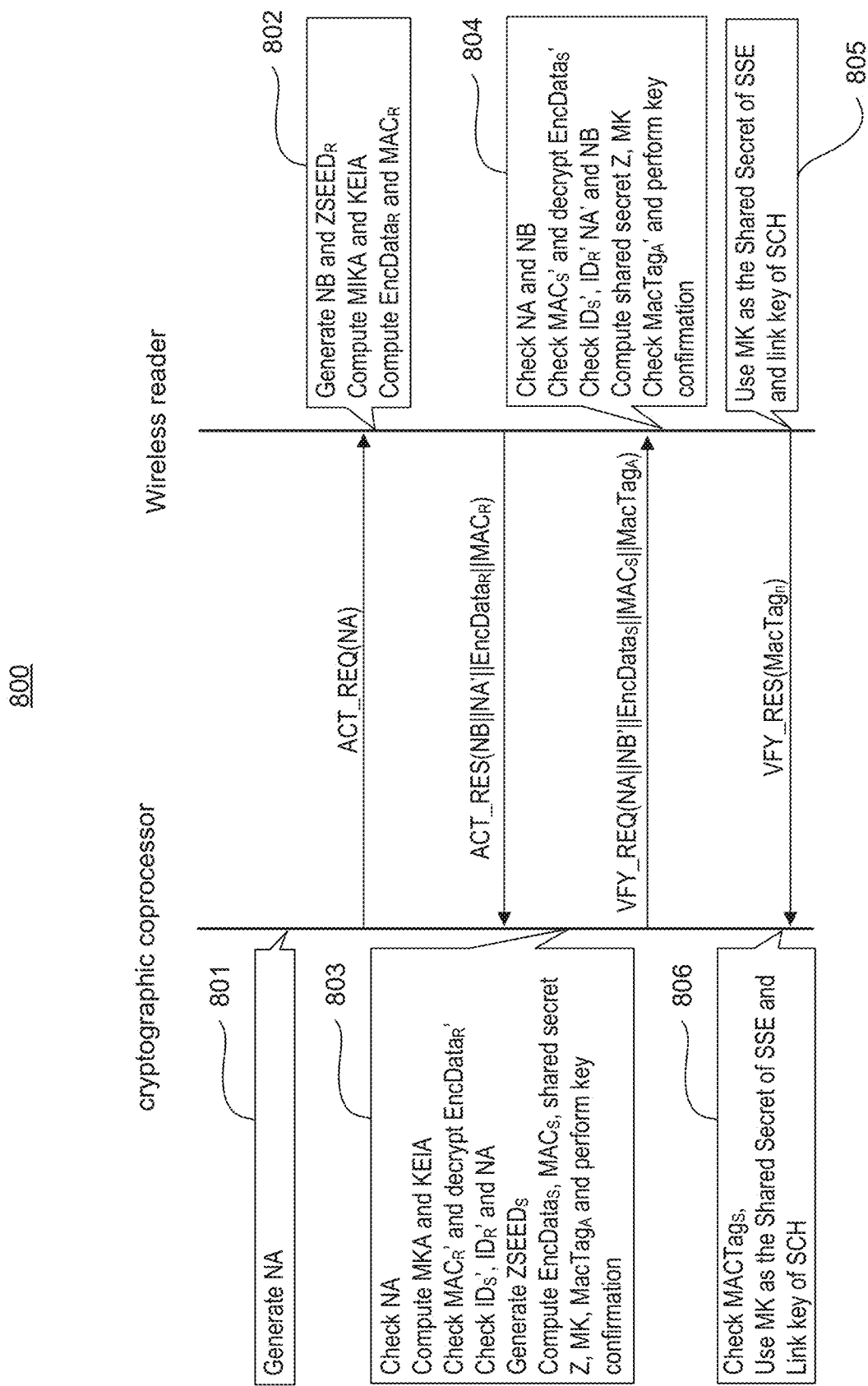
FIG. 8 is an exemplary key agreement and confirmation mechanism between a cryptographic coprocessor and a reader, consistent with disclosed embodiments.

FIG. 8 illustrates an exemplary key agreement and confirmation process 800 between a cryptographic coprocessor and a wireless module. Process 800 describes cryptographic mechanisms that use the Elliptic Curves Diffie-Hellman (ECDH) protocol. In some embodiments, a key length of 256 bits for key agreement and the Advanced Encryption Standard (AES) algorithm in Galois/Counter Mode (GCM) mode to provide data authenticated encryption.

In step 801, cryptographic coprocessor 116 may generate a random number (NA) that is transmitted in a request to a wireless reader, such as a payment terminal. In response, in step 802 a wireless reader may generate a second random number (NB) and a "sender seed" for the derivation of a shared secret pass. In addition, in step 802 the wireless reader may compute a Master key and an Encryption and integrity key to be used in the entity authentication. Further, in step 802 the wireless reader may compute an encrypted data (EncData) package and a message authentication code (MAC).

In step 803, cryptographic coprocessor 116 may receive information from the wireless reader and check if the random number NA, previously sent to the wireless reader in the payload of the request, is the same as received in the response; derive keys MACsec Key Agreement (MKA) and KEIA; decipher EncDataR' and verify the value of MACR' per 9.6.4, obtain the values of NB', NA, IDR', IDS', then verify that the Instantaneous Decoding Refresh (IDR') and IDS' equal the respective n-entity-title values; check that the random number NA sent to the wireless reader in the payload of the request and the random number NB' received from the wireless reader in the payload of the response are the same as the received in the EncDataR'. In addition, cryptographic coprocessor 116 may compute the value of EncDataS and MACS, generating the nonce ZSEEDS, Generate the shared code, Compute the MK and MacTagA.

In response, in step 804, wireless reader may Derive keys MKA and KEIA, Compute the value of EncDataR and MACR. It may then check if the random numbers are the same as received, decipher and verify the value of MACS', check that the random numbers are the same as received in the data.

Finally, in steps 808 and 806, after the key agreement is reached cryptographic coprocessor 116 and wireless reader may link via a secure channel service (SCH) to exchange account and transaction information.

FIG. 9 is an exemplary flow chart illustrating a gesture programming and transaction process 900. Using active electronic components in contactless payment devices, e.g., devices 100, 200, and 300 allows the personalization of enabling gestures by a user that would activate the contactless payment method. In this way, even if the contactless payment device is stolen or lost, the device could not be activated without the performance of the personalized user gestures. Process 900 stores and then detects the personalized user gestures to activate or deactivate wireless devices by setting actuator 106 in a closed or open position. In some embodiments, process 900 may be carried out by MCU 120, but other elements may also perform these processes.

In step 902, MCU 120 may identify a programing signal from an input device indicating that the user intends to store a new input gesture. For example, MCU 120 may detect that button 114 has been pressed for more than a threshold time. Alternatively, MCU 120 may detect a programming signal when it receives a specific input from accelerometer 112. For example, MCU 120 may identify an input from accelerometer 112, characteristic of a shaking gesture, as the programming signal.

In step 904, MCU 120 may identify subsequent gestures as an enabling gesture that the user wants to store. MCU 120 may store signals corresponding to the gestures during a programming interval as a pre-programmed enabling gesture. For example, after receiving a shaking input from the accelerometer 112 (programming input), MCU 120 may receive a "raising" signal from the accelerometer 112, characteristic of a wallet being retrieved from a pocket. MCU 120 may then associate the raising signal from the accelerometer as a signal that, upon subsequent detection after the programming process has been completed, would be recognized as a request from the user to enable the contactless payment device by closing actuator 106 to enable wireless circuitry such as circuit 400 or wireless module 118. Other gestures may also be stored as enabling gestures. For example, a tapping gesture may be stored and subsequently recognized as an enabling gesture. Also, MCU 120 may identify a series of signals as an enabling gesture. Other examples include combinations of gestures, such as two different shaking motions, or a shaking and tapping combination.

After programming is completed, in step 906, MCU 120 may receive incoming signals from accelerometer 112. In embodiments in which low-pass filter 113 or noise reducing wire 204 are part of the contactless payment device, MCU 120 may directly process the signal. However, in embodiments in which there is no previous filtering, MCU 120 may perform filtering operations such as FFT in step 906.

In step 908, MCU 120 may determine if the incoming signals received from the accelerometer correspond to any of the enabling gestures programmed in step 904. MCU 120 may do this by after processing the signals to compare them in frequency or time. For instance, MCU 120 may transform the accelerometer signals to frequency domain using FFT and compare the frequency components of the stored accelerometer signals with the signals received in step 906. For example, in step 908 may perform an FFT of the signals received in step 906 and identify dominant frequencies. MCU 120 may also generate filtered frequencies by discarding dominant frequencies outside an accepted window. MCU 120 may additional compare the filtered frequencies with dominant frequencies of the pre-programmed signals generated by enabling gestures.

Other data processing techniques to compare the two signals may also be performed by MCU 120. For example, MCU 120 may comprise an analog-to-digital converter (ADC). In such embodiments MCU 120 may digitize the signal and compare averages and standard deviations of the digitization to quickly compare the two signals. For example, MCU 120 may generate a digital gesture signal using ADC to convert the signal from accelerometer 112. MCU 120 may filter the gesture signal by applying a medial filter to the digital gesture signal and compared filtered gesture signal with a pre-programmed signal associated with the pre-programed gesture of step 904.

If MCU 120 determines that the incoming accelerometer signals do not correspond to any pre-programed enabling gesture signals (step 908: no), then MCU 120 may continue to step 910 and set the actuator in an open state to prevent activation of the wireless circuitry. If the incoming accelerometer signals do not correspond to any pre-programed enabling gesture signals, it may mean that the user does not want to activate wireless module 118 or that an unauthorized user is attempting to use wireless features of the contactless payment method. Thus, MCU 120 does not activate the wireless module 118 by setting actuator 106 in the open state. In some embodiments, MCU 120 may transmit an error signal to indicator 102.

On the other hand, if MCU 120 determines that incoming accelerometer signals do correspond to at least one of the pre-programed enabling gesture signals (step 908: yes), then the user is likely trying to use the wireless module 118 to initiate a contactless payment and MCU 120 may continue to step 912. In step 912, MCU 120 may set the actuator in the closed state, by for example biasing actuator 106, to activate wireless circuitry.

MCU 120 may also perform step 914 to activate indicator 102 and indicate that the actuator is closed and the wireless circuitry is engaged. For example, MCU 120 may transmit an accepting signal to indicator 102. Once the wireless circuitry is activated, as further explained in connection to FIGS. 7 and 8, MCU 120 may execute instructions to transmit data to a payment terminal.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed remote control system and related methods. Other embodiments will be apparent to those skilled in the art from consideration of the specification and practice of the disclosed remote control system and related methods. It is intended that the specification and examples be considered as exemplary only, with a true scope being indicated by the following claims and their equivalents.

What is claimed is:

1. A contactless payment device comprising:
   a wireless communication device;
   an accelerometer; and
   an actuator configured to:
      activate the wireless communication device when the actuator is set in a closed state, and
      deactivate the wireless communication device when the actuator is set in an open state; and
   one or more processors configured to:
      receive an incoming signal via the accelerometer;
      determine whether the incoming signal corresponds to a first gesture by analyzing the incoming signal to identify dominant gesture frequencies;
      set the actuator in the closed state when the incoming signal corresponds to the first gesture;
      receive a request from a payment terminal via the wireless communication device;
      transmit, based on a verification of the request, instructions to the wireless communication device to transmit information to the payment terminal; and
      subsequent to transmitting the information to the payment terminal, set the actuator in the open state.

2. The contactless payment device of claim 1, wherein the one or more processors are configured to:
   determine a charge level of a power source of the contactless payment device; and
   set the actuator to the closed state when the charge level is below a threshold.

3. The contactless payment device of claim 1, wherein the first gesture comprises at least one of shaking or tapping the contactless payment device.

4. The contactless payment device of claim 1, wherein:
   the wireless communication device comprises an NFC coil; and
   the actuator comprises a solid-state switching device connected in series with the NFC coil.

5. The contactless payment device of claim 1, wherein:
   the one or more processors set the actuator in the closed state by biasing a P-Channel MOSFET into saturation; and
   the one or more processors set the actuator in the open state by biasing the P-Channel MOSFET into sub-threshold.

6. The contactless payment device of claim 1, wherein the accelerometer is communicatively coupled to the one or more processors through a low-pass filter.

7. The contactless payment device of claim 1, wherein analyzing the incoming signal to identify dominant gesture frequencies comprises performing a Fast Fourier Transform of the incoming signal.

8. The contactless payment device of claim 1, wherein analyzing the incoming signal to identify dominant gesture frequencies comprises:
generating a digital version of the incoming signal via an analog-to-digital converter;
generating a filtered incoming signal by applying a medial filter to the digital version of the incoming signal; and
comparing the filtered incoming signal with one or more dominant gesture frequencies of pre-programmed signals.

9. The contactless payment device of claim 1, wherein the accelerometer is communicatively coupled to the one or more processors with a cable comprising a center conductor, a triboelectric dispersion layer, and a braided shield.

10. A method comprising:
receiving an incoming signal via an accelerometer of a contactless payment device;
determining that the incoming signal corresponds to a first gesture;
activating, based on the incoming signal corresponding to the first gesture, a wireless device of the contactless payment device by setting a switching device of the contactless payment device in a closed state;
receiving a request from a payment terminal via a wireless communication device of the contactless payment device and performing verification of the request from the payment terminal;
transmitting, based on the verification of the request, via the wireless communication device, secure data to perform a transaction; and
deactivating the wireless device by setting the switching device in an open state subsequent to transmitting the secure data.

11. The method of claim 10, further comprising:
determining a charge level of a power source of the contactless payment device; and
setting the switching device to the closed state when the charge level is below a threshold.

12. The method of claim 10, wherein the first gesture comprises at least one of shaking or tapping the contactless payment device.

13. The method of claim 10, wherein setting the switching device of the contactless payment device in the closed state comprises biasing a P-Channel MOSFET into saturation, and wherein setting the switching device of the contactless payment device in the closed state comprises biasing the P-Channel MOSFET into subthreshold.

14. The method of claim 10, wherein determining that the incoming signal corresponds to the first gesture comprises performing a Fast Fourier Transform of the incoming signal.

15. The method of claim 10, wherein determining that the incoming signal corresponds to the first gesture comprises:
generating a digital version of the incoming signal via an analog-to-digital converter;
generating a filtered incoming signal by applying a medial filter to the digital version of the incoming signal; and
comparing the filtered incoming signal with one or more dominant gesture frequencies of pre-programmed signals.

16. One or more non-transitory computer-readable media storing instructions that, when executed by one or more processors, cause operations comprising:
receiving an incoming signal via an accelerometer of a contactless payment device;
activating, based on the incoming signal corresponding to a first gesture, a wireless device of the contactless payment device by setting a switching device of the contactless payment device in a closed state;
receiving a request from a payment terminal via a wireless communication device of the contactless payment device;
transmitting, based on a verification of the request, via the wireless communication device, secure data to perform a transaction; and
deactivating the wireless device by setting the switching device in an open state subsequent to transmitting the secure data.

17. The one or more non-transitory computer-readable media of claim 16, the operations further comprising:
determining a charge level of a power source of the contactless payment device; and
setting the switching device to the closed state when the charge level is below a threshold.

18. The one or more non-transitory computer-readable media of claim 16, wherein setting the switching device of the contactless payment device in the closed state comprises biasing a P-Channel MOSFET into saturation, and wherein setting the switching device of the contactless payment device in the closed state comprises biasing the P-Channel MOSFET into subthreshold.

19. The one or more non-transitory computer-readable media of claim 16, the operations further comprising:
determining that the incoming signal corresponds to the first gesture by performing a Fast Fourier Transform of the incoming signal.

20. The one or more non-transitory computer-readable media of claim 16, the operations further comprising determining that the incoming signal corresponds to the first gesture by:
generating a digital version of the incoming signal via an analog-to-digital converter;
generating a filtered incoming signal by applying a medial filter to the digital version of the incoming signal; and
comparing the filtered incoming signal with one or more dominant gesture frequencies of pre-programmed signals.

* * * * *